United States Patent
Alvarez, Jr. et al.

(10) Patent No.: US 7,510,692 B2
(45) Date of Patent: Mar. 31, 2009

(54) HYDRIDE GAS PURIFICATION FOR THE SEMICONDUCTOR INDUSTRY

(75) Inventors: Daniel Alvarez, Jr., San Diego, CA (US); Jeffrey J. Spiegelman, San Diego, CA (US); Joshua T. Cook, Encinitas, CA (US); Tram Doan Nguyen, Westminster, CA (US); Daniel A. Lev, Somerville, MA (US); Troy B. Scoggins, San Diego, CA (US)

(73) Assignee: Entegris, Inc., Chaska, MN (US)

( * ) Notice: Subject to any disclaimer, the term of this patent is extended or adjusted under 35 U.S.C. 154(b) by 354 days.

(21) Appl. No.: 10/565,353

(22) PCT Filed: Jul. 21, 2004

(86) PCT No.: PCT/US2004/023491

§ 371 (c)(1),
(2), (4) Date: Mar. 23, 2006

(87) PCT Pub. No.: WO2005/009593

PCT Pub. Date: Feb. 3, 2005

(65) Prior Publication Data

US 2006/0188420 A1    Aug. 24, 2006

Related U.S. Application Data

(60) Provisional application No. 60/513,351, filed on Oct. 22, 2003, provisional application No. 60/488,850, filed on Jul. 21, 2003.

(51) Int. Cl.
*B01D 53/38* (2006.01)
*B01D 53/50* (2006.01)
*B01D 53/56* (2006.01)
*B01D 53/62* (2006.01)
*B01D 53/72* (2006.01)
*C09K 3/00* (2006.01)

(52) U.S. Cl. .................. 423/210; 423/220; 423/230; 423/219; 423/245.1; 423/239.1; 423/242.1; 423/244.01; 423/244.06; 252/182.11; 252/182.32; 252/182.33

(58) Field of Classification Search ............ 423/210, 423/220, 230, 219, 245.1, 239.1, 242.1, 244.01, 423/244.06; 252/182.11, 182.32, 182.33
See application file for complete search history.

(56) References Cited

U.S. PATENT DOCUMENTS

| 4,976,944 A | 12/1990 | Pacaud et al. |
| 5,716,588 A * | 2/1998 | Vergani et al. ............ 422/177 |
| 6,059,859 A | 5/2000 | Alvarez, Jr. et al. |
| 6,241,955 B1 * | 6/2001 | Alvarez, Jr. ............... 423/210 |
| 6,391,090 B1 | 5/2002 | Alvarez, Jr. et al. |
| 2001/0012502 A1 * | 8/2001 | Okumura et al. ......... 423/213.5 |

FOREIGN PATENT DOCUMENTS

| WO | WO 03/037485 | 5/2003 |
| WO | WO2005/000449 | 1/2005 |

\* cited by examiner

*Primary Examiner*—Timothy C Vanoy
(74) *Attorney, Agent, or Firm*—Hamilton, Brook, Smith & Reynolds, P.C.

(57) ABSTRACT

A method for hydride gas purification uses materials having at least one lanthanide metal or lanthanide metal oxide. The method reduces contaminants to less than 100 parts per billion (ppb), preferably 10 ppb, more preferably 1 ppb. The material can also include transition metals and transition metal oxides, rare earth elements and other metal oxides. The invention also includes materials for use in the method of the invention.

24 Claims, 6 Drawing Sheets

HYDRIDE GAS PURIFICATION FOR THE SEMICONDUCTOR INDUSTRY

RELATED APPLICATIONS

This application is the U.S. National Stage of International Application No. PCT/US2004/023491, filed 21 Jul. 2004, published in English, which claims the benefit under 35 U.S.C. § 119 or 365 to U.S. Provisional Application No. 60/488,850, filed Jul. 21, 2003 and U.S. Provisional Application No. 60/513,351, filed Oct. 22, 2003. The entire teachings of the above applications are incorporated herein by reference.

BACKGROUND OF THE INVENTION

Hydride gases, especially ammonia, are used in a number of processes including the manufacturing of semi-conductors and LEDs. Other hydride gases, such as arsine ($AsH_3$) and phosphine ($PH_3$), are also used to manufacture semiconductor thin films such as gallium arsenide (GaAs) and gallium phosphide (GaP), which are used in high speed data transmission equipment, cell phones, videophones and commercial satellites. Additional hydride gases used in the manufacture of semiconductors include diborane ($B_2H_6$), disilane ($Si_2H_6$), germane ($GeH_4$) and silane ($SiH_4$). For purposes of the invention, hydrogen ($H_2$) is also considered to be a hydride gas.

Advances in integrated circuit semiconductor technology have included the development of semiconductors with copper interconnects instead of aluminum interconnects. Copper interconnects are advantageous in that copper has less resistance than aluminum, which leads to higher performance in microprocessors, microcontrollers and random access memories.

However, copper tends to migrate over a period of time, so it is necessary to construct barrier layers in the semiconductor to prevent the migration of copper. Such barrier layers are typically made of nitrides such as tantalum nitride (TaN), titanium nitride (TiN) or silicon nitride ($Si_3N_4$). These layers are commonly formed by deposition from a hydride gas, such as ammonia ($NH_3$) and/or silane gas.

Further, ammonia is widely used as a source of nitrogen for film development in some thin film applications. The ammonia allows for lower temperature film growth in chemical vapor deposition (CVD) processes. Silane and germane are used for SiGe films and high speed integrated circuits.

In addition, there is current research to develop high performance light emitting diodes (LEDs). These are made by metal organic chemical vapor deposition (MOCVD). Trialkyl gallium reacts with a gaseous mixture of ammonia and hydrogen to be deposited as gallium nitride.

Gallium nitride is also being considered for "blue lasers," i.e., lasers that emit blue light. Blue lasers are anticipated to be capable of forming compact disks that will have a much higher information density than is presently possible with compact disks produced with red laser light. Gallium nitride for such blue lasers would be manufactured from the same type of ammonia/hydrogen gaseous environment as described above for the high capacity LEDs.

The LEDs, blue lasers and integrated circuits are all manufactured with electron accepting p-type dopants. Such products are extremely sensitive to the presence of electron-donating n-type materials, and very small concentrations of such n-type material are sufficient to deactivate the p-type dopants and impair or destroy the performance and operability of the integrated circuits, LEDs and blue lasers. Oxygen is a particularly efficient n-type material, and the presence of molecular oxygen is detrimental to the desired band gap properties in the semiconductor material. Even very low concentrations of oxygen (<10 ppb) can be sufficient to cause a significant reduction in performance or operability so as to require discarding the product after manufacture. The presence of oxygen in the manufacture of LEDs results in a decrease in the photoluminescence intensity.

Water vapor and carbon dioxide gas are two other detrimental contaminants in hydride gases, which lead to degradation of products that are formed by deposition of active layers of metals or metal compounds from a hydride gas environment. Water is one of the most common and yet most difficult impurities to remove from the gases. Water is ubiquitous in almost all ambient environments. Even systems that are nominally referred to as "dry" usually have significant amounts of water, and most drying processes can reduce the moisture content of a gas only to a "minimum" that is still in the parts per million (ppm) range. However, because water contents in the ppm range are quite acceptable for many purposes, there are numerous patents and articles in the literature dealing with such types of "ppm drying processes."

In the manufacture of the aforesaid LED, blue laser and integrated circuit products, however, moisture contents of the depositing gases which are in the ppm range are excessively wet. Impurities in the gas result in the loss of photoluminescence intensity when water is incorporated as a dopant contaminant in gallium nitride films. To form satisfactory products, the water content of the depositing gases must be reduced to the parts per billion (ppb) range, usually to no more than about 100 ppb. See Whitlock et al., "High Purity Gases," in Ruthven, ed., ENCYCLOPEDIA OF SEPARATION TECHNOLOGY, vol. 1, pp. 987-1000 (1997).

Attempts to use materials such as reduced nickel or copper catalysts to remove contaminants such as oxygen, carbon dioxide and water from hydride gases have not been successful. While contaminant removal can be effected for short periods of time down to the 10 ppb level, the reactive effects of the hydride gases, especially ammonia, very quickly cause the materials to degrade and contaminate the gas stream with metal complexes. Although pre-existing impurities may be reduced with these materials, the introduction of new impurities to the manufacturing process is unacceptable.

Some prior art processes have been described in which oxygen has been removed from ammonia streams by metals or metal complexes serving as "getters." However, these have been relatively ineffective at sufficiently decontaminating a gas stream. In addition, the getters are typically deposited on substrates, such as silica or zeolites, which do not play a central role in the decontamination process, and may themselves be degraded by the hydride gases. See, for instance, U.S. Pat. No. 5,496,778 (Hoffman et al.), U.S. Pat. No. 5,716,588 (Vergani et al.) and U.S. Pat. No. 4,976,944 (Pacaud et al.); PCT Publication No. WO 97/06104 (SAES Getters S.p.A.); and European Patent No. EP 0 784 595 B1 (SAES Getters S.p.A.).

Alvarez (U.S. Pat. No. 6,241,955) teaches the use of mixed compositions of high surface area (>100 $m^2/g$, preferably 200-800 $m^2/g$) reduced metal oxides for the removal of a number of contaminants from hydride gases including oxygen, carbon dioxide and water vapor from hydride gases, including low alkyl analogs of hydride gases. The metal oxides are preferably those of manganese or molybdenum and can be optionally mixed with iron oxide. Such materials were found to be stable for long term use; however, water removal efficiencies and water and oxygen capacities were found to be limited such that it is necessary to augment these materials with additional drying agents such as molecular sieves (e.g., Vergani, U.S. Pat. No. 5,716,588).

The problem of removal of contaminant levels down to ≦100 ppb in hydride gases remains a significant problem in the field of production of high purity LEDs, blue lasers, semiconductors, and the like. Those processes that are being used are expensive because of the very short service life of the decontaminating materials and their need for frequent replacement. In addition, since it is difficult to determine the exact rate of deterioration of the decontaminating materials in the presence of the reactive hydride gases, users of such decontaminating materials must schedule their discard and replacement at intervals less than the shortest expected service life. To do otherwise would risk failure of a decontamination unit thereby resulting in a contaminated product. Consequently, current systems require that many if not most of the decontamination units must be discarded while they still have some degree of useful service life left, thus further increasing the expense of the system operations.

SUMMARY OF THE INVENTION

The present invention provides compositions of matter and methods of gas purification that evince a dramatic increase in capacity of contaminant removal over that provided by the prior art. Moreover, on a contaminant sequestering capacity per unit surface area basis, the present invention provides an even starker advantage over materials and methods in the prior art.

The invention includes a method for the removal of contaminants from a hydride gas stream. The method involves contacting the hydride gas with a material comprising a quantity of a lanthanide metal oxide, preferably where the material has a surface area of less than about 100 $m^2/g$, for a sufficient time to reduce the level of contamination of the gas stream to no more than about 100 ppb. Additionally, the material is generally stable and substantially unaffected by the presence of hydride gas as demonstrated by maintaining the desired level of contamination for a time period of at least six months under typical operating conditions and with a sufficient quantity of the material.

The method of the invention comprises the use of any of a number of lanthanide metals optionally in conjunction with a less electropositive metal oxide, including rare earth metal oxides and transition metal oxides. These metals are highly electropositive relative to the metals overall, but less electropositive than the lanthanide series elements.

The invention also provides purification compositions. Such purification compositions are generally intended for use in the method of the invention. The compositions are purification materials that include lanthanide metal oxides, optionally in combination with other highly electropositive metals or metal oxides that provide structure and preferably contaminant removal capacity. The metals and metal oxides can be partially or completely reduced. The metals and metal oxides preferably exist in a mixed oxidation state, where the oxide portion has sufficient structural stability to keep the composition intact. Additional metals and metal oxides used in the invention may further include alkaline earth and rare earth metals, other lanthanide metals and/or transition metals. Compositions of the instant invention are substantially unaffected by the presence of hydride gas, as demonstrated by having a service life of at least about at least 6 months for typical uses of a sufficient quantity of material before the media must be regenerated.

The invention is based upon the discovery that lanthanide metal oxides are highly efficient gas purification substrates. It has been further discovered that lanthanide metal oxides can efficiently remove contaminants despite their relatively low surface areas, typically less than 100 $m^2/g$. This is surprising in view of the fact that purification substrates are typically high surface area materials where purification of gases takes place predominantly on the surface of the substrate. The unique properties of the lanthanides provide high mobility of oxygen within the lattice interior of the substrate, which provides increased oxygen capacity. The high coordination number of the lanthanides provides high moisture capacity on the surface as compared to other substrates with comparable and even substantially greater surface areas.

The invention also relates to the discovery that iron (Fe) containing purification substrates release carbon monoxide (CO) under some purification conditions, resulting in the addition of contaminants to gas during the purification process (see Example 2). As the purification substrates of the instant invention typically exclude iron, this source of contamination of gas during purification is eliminated.

DETAILED DESCRIPTION OF THE INVENTION

Figure 1:
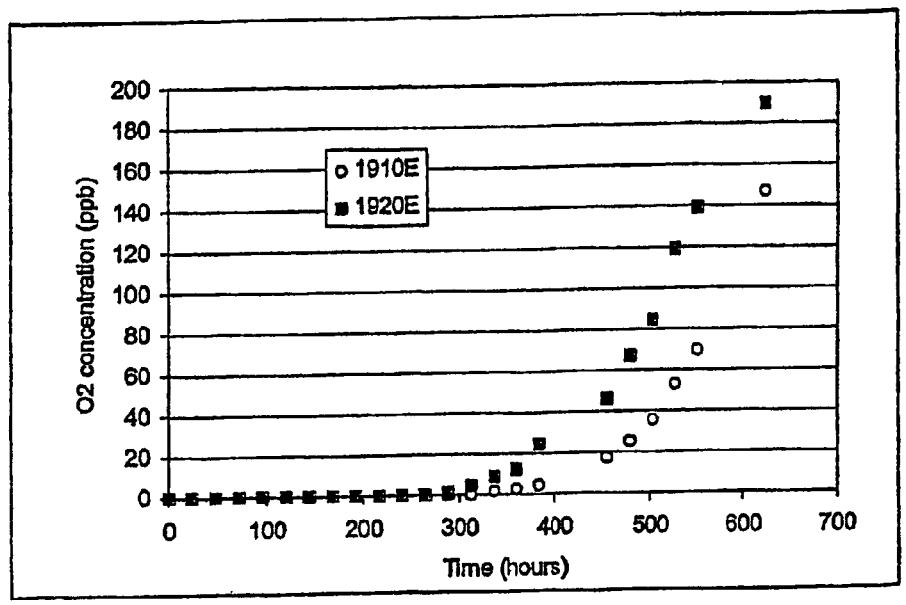
FIG. 1 is an oxygen breakthrough curve for the C and D purification substrates.

The invention is a method for the purification of hydride gases comprising exposure of the hydride gas stream to a purification substrate with a relatively low surface area, preferably less than about 100 $m^2/g$, containing at least one lanthanide group metal oxide for sufficient time to reduce the contaminants to less than 100 ppb, preferably 10 ppb, more preferably 1 ppb, even more preferably 0.1 ppb. Contaminants removed by the method include water ($H_2O$), carbon dioxide ($CO_2$), oxygen ($O_2$), non-methane hydrocarbons, hydride gas oxidation products (e.g., siloxane from the reaction of silane and water), secondary hydride gas contaminants (e.g., ppm phosphine in silane), and sulfur (e.g., $SO_x$, where x is 1-3) and nitrogen (e.g., $NO_x$, where x is 1-3) containing compounds. Contaminants removed by the method further include metal-containing compounds and volatile metal compounds, particularly transition metal halides, which are critical impurities in semiconductor processes such as deposition and etching. Examples of volatile metal compound contaminants are $TiCl_4$, $AlCl_3$, and $CrF_5$. Therefore, in one embodiment of the present invention metal impurities are removed from a hydride gas stream to less than 10 ppb, preferably less than 1 ppb, more preferably less than 0.1 ppb.

The conventional wisdom set forth in the prior art is that purification substrates of high surface area materials can be improved by increasing the surface area of the substrate, because the purification of gases takes place predominantly on the surface of the substrate. Yet the demands of the semiconductor industry, for example, require that contaminants be removed to lower and lower levels, yet be accomplished at a lower cost. As the cost of materials typically increases with higher surface area, new, more efficient purification compositions are needed that decontaminate efficiently at relatively low surface areas. The instant invention provides a unique purification substrate, both in its surface area characteristics and its composition in containing lanthanides.

In a preferred embodiment of the invention, a composition of the invention comprises about 3-20% of a lanthanide oxide, preferably lanthanum oxide. Preferably, the composition is essentially free of at least one of copper, iron and nickel, particularly iron. The material can also contain manganese oxide, for example, about 75-90% manganese dioxide, optionally a transition metal or transition metal oxide, and the balance in fillers such as silicon dioxide, aluminum oxide and/or potassium oxide. Preferably, the composition comprises about 8% lanthanum oxide, about 88% manganese dioxide and about 4% fillers such as silicon dioxide, aluminum oxide and/or potassium oxide. The oxidation state of the materials in the purification substrate will vary depending on the activation of the substrate and the point in the service life of the substrate.

The lanthanide group elements comprise a unique series of metals in the periodic table. These metals are distinctive in terms of size, valence orbitals, electrophilicity, and magnetic and electronic properties. The lanthanide 4f valence orbitals have a limited radial extension. As a result, orbital factors do not affect the chemistry as much as in transition metal chemistry wherein the valence orbitals have relatively large radial extensions. This means that potential reactants can approach the lanthanide metal center in a variety of orientations and reaction pathways are not orbitally forbidden. Additionally, the lanthanides are quite electropositive and as such have a high affinity for oxygen containing molecules. The lanthanide series metals exhibit electronegativities between 1.10 and 1.25 on the Pauling scale.

The ability of materials containing lanthanide series elements to maintain mixed oxidation states is well known. However, the ability to predict oxidation states is limited, because the metallic state of lanthanides is essentially unknown except under extreme circumstances (e.g., generated at high temperatures and stored under inert conditions) due to their thermodynamic instability. For example, the reduction potential of La(III) to La is 2.37. Consequently, lanthanide group metals are highly reactive with oxygen and oxidize rapidly upon exposure to air.

The term oxygen storage capacity is defined as the unique ability of lanthanum and cerium oxides and similar materials (lanthanide oxides) to readily accept or donate oxygen atoms within the material. This capacity results in the facile redistribution of oxygen occupancies and vacancies throughout the material, including catalytically active sites, even when these sites are occupied by non-lanthanide elements. Such fluid lattices are possible with a wide range of lanthanide oxide to metal/metal oxide ratios. While the mechanism of this oxygen storage capacity is still under investigation, it is believed that the highly electropositive nature and ionic bonding properties of the lanthanide elements play a role. Due to the high mobility of oxygen within the substrate, low surface area materials can be used successfully for purification.

Lanthanide metals have high coordination numbers, typically in the range of 6 to 12. This is substantially higher than the coordination numbers of transition metals that typically range from 4 to 6. Therefore, lanthanide metals have a high potential binding capacity. Lanthanide metals preferentially bind compounds containing highly electronegative elements or polarized compounds, including common gas contaminants such as oxygen containing compounds (water, $CO_2$, $O_2$), as well as non-methane hydrocarbons, siloxanes, non-ammonia hydride gases, hydride gas oxidation products, secondary hydride gas contaminants, volatile metal compounds and sulfur and nitrogen containing compounds. High coordination numbers effectively increase the active surface of the substrate by providing a substantially higher number of binding sites per area on the surface of the substrate.

Compositions of the instant invention comprise at least one lanthanide group metal oxide, preferably one or more of lanthanum (La), cerium (Ce), praseodymium (Pr), neodymium (Nd), promethium (Pm), samarium (Sm), europium (Eu), gadolinium (Gd), terbium (Th), dysprosium (Dy), holmium (Ho), erbium (Er), thulium (Tm) and ytterbium (Yb), more preferably La, Ce and Sm, even more preferably La predominantly in the form of $La_2O_3$, but is typically in a mixed oxidation state. Members of the lanthanide group typically are present in multiple oxidation states, with mixed oxidation states being common (e.g., $La^{II}$ and $La^{III}$; $Ce^{IV}$ and $Ce^{III}$; $Sm^{III}$ and $Sm^{II}$; and $Yb^{III}$ and $Yb^{II}$) although further reduced states are theoretically possible. In both nature and in the materials of the invention, it is unlikely that the metal oxides exist in a single discrete oxidation state. For example, Ce is considered to have an effective oxidation state of about 3.3 to 3.8.

The lanthanide metals and metal oxides may optionally be supplemented with one or more rare earth metals, preferably scandium (Sc), yttrium (Y) or lutetium (Lu).

In a preferred embodiment, the compositions of the instant invention further include one or more highly electropositive metals (e.g., transition metal) that are less electropositive than the lanthanide metals. The highly electropositive metal should be in a metallic state or a mixed oxidation state, where at least some of the metal is in the metallic state. Such metals include, but are not limited to, molybdenum (Mo), manganese (Mn), chromium (Cr), rhenium (Re), platinum (Pt), rhodium (Rh), ruthenium (Ru), vanadium (V), titanium (Ti), zirconium (Zr) and cobalt (Co) and are preferably Mn, Cr, Mo, V, Ti and Zr.

It has been found that lanthanide metal oxides are particularly efficient in the removal of oxygen containing contaminants, especially water, from hydride gas streams. The capacity of the compositions of the instant invention to remove contaminants are compared to prior art compounds in the Examples and are demonstrated to be superior to those previously taught (e.g., those taught in U.S. Pat. No. 6,241,955). This is exceptionally surprising given the low surface areas of the materials disclosed herein, in view of the teachings of the prior art regarding the desirability of high surface areas.

Purification methods of the invention typically include contacting a hydride gas, typically UHP grade (99.999% pure), with a composition of the instant invention for sufficient time to allow the removal of contaminants to the level required for the end use, preferably less than 100 ppb total contaminants, more preferably less than 10 ppb, and most preferably less than 1 ppb. The exact parameters for purification will depend on a number of factors well known to those skilled in the art including, but not limited to, purity of source gas, required production levels, end use and purification material used. Exemplary purification conditions are described in the Examples below. Contaminants to be removed include $H_2O$, $O_2$, $CO_2$, non-methane hydrocarbons, hydride gas oxidation products, volatile metal compounds and secondary hydride gas contaminants, with the material being most efficient at the removal of $H_2O$ and $O_2$.

Materials for the instant invention preferably have a surface area of less than 100 $m^2/g$, although greater surface areas are permissible. The surface area of the material should take into consideration both the interior and exterior surfaces. Surface area is determined according to industry standards, typically using the BET model. The surface area may be as low as 75 $m^2/g$, 50 $m^2/g$ or even 20 $m^2/g$. In order to obtain the desired surface areas, particularly those of about 50 $m^2/g$ or greater, it may be necessary to support the lanthanide metal or metal oxide materials on a support material. The support materials may contribute to hydride purification. Suitable support materials are not susceptible to corrosion or breakdown in the presence of the hydride gases purified in the instant invention. Suitable materials are also stable in a reducing environment and under conditions that may be required for conditioning of the material, such as heating up to 400° C. Preferably, the materials are also stable under conditions required for regeneration.

In a preferred embodiment, the lanthanides are intimately mixed with the highly electropositive metal by methods including, but not limited to, sol-gel synthesis, co-precipitation, impregnation and combustion synthesis. Such methods are well known to those skilled in the art.

Compositions of the instant invention are mixtures of at least one metal (M) oxide, $MO_x$, preferably a transition metal oxide, and at least one lanthanide metal (M') oxide, $M'O_y$. The compositions of the invention can be formed by impregnation, coprecipitation or other method known to those skilled in the art. The mixtures are activated with heat in the presence of $H_2$ or other reducing gas (e.g. CO, methane) to release $O_2$, possibly in the form of water, to reduce the mixture. The reaction can be represented by:

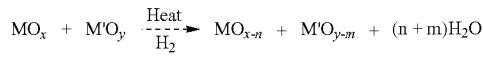

wherein $0 \leq x-n \leq 1$ and $0 \leq m \leq 1$. Typically when M is Mo, Mn, Fe or Re, x-n=1. With other transition metals, typically, x-n=0. Examples of compositions that are useful for the instant invention include mixtures of Ce and Sm; Ce and Zr; and Li and La. The combination of lanthanide and transition metals results in an irregular lattice with a high oxygen capacity that allows for facile redistribution of oxygen occupancies and vacancies throughout the material.

The materials of the instant invention can be used in any of a number of purification apparatuses including, but not limited to, canister and multiple and single bed apparatuses. In a preferred embodiment, the purifier has multiple beds to allow for regeneration of one bed while gas is purified in another. Purification comprises contacting the adsorbent material with the hydride gas stream for sufficient time to allow for decontamination to the desired level. Decontamination considerations such as time, pressure, flow rate and temperature can be readily determined by those skilled in the art.

Regeneration of the purification material can be performed with high heat (about 700° C.), or at lower temperatures (about 400° C.) in the presence of a reducing agent (e.g. $H_2$). In a preferred embodiment the ultrapure hydrogen required for regeneration of the beds is obtained by bleeding off a portion of the purified hydride gas and cracking it to release hydrogen (e.g. see U.S. Pat. No. 6,524,544). This allows for the system to remain closed and insures the high quality of the gas used for regeneration.

The purification materials of the instant invention are substantially unaffected by the presence of hydride gas. Substantially unaffected is defined as the material being not so physically damaged by exposure to hydride gas in the course of removing contaminants from hydride gas so as to prevent its performance of its intended function of removing contaminants from a hydride gas stream. The intended function of the materials is to remove contaminants to a desired level from hydride gases for at least about 6 months before regeneration of the material is required. Typically, a material with an oxygen capacity of at least about 4 liters of oxygen per liter of material at 25° C. and 15 psig is able to remove contaminants for at least about 6 months. Such materials also typically have a capacity for water vapor of at least about 4 liters of water vapor per liter of material at 25° C. and 15 psig. Further, the materials of the invention have sufficient structural integrity to resist erosion or breakage in a flowing gas stream.

All references set forth herein are incorporated by reference in their entirety. All percentages are by weight unless otherwise specified.

EXEMPLIFICATION

TABLE 1

Compositions and surface areas of media used in the Examples

| Media | Composition | Surface area |
|---|---|---|
| A | 80% $MnO_2$; 10% $Fe_2O_3$ 10% $Al_2O_3$ | 207 $m^2/g$ |
| B | 96% $MnO_2$; 4% $SiO_2$ and fillers | 38 $m^2/g$ |
| C | 90% $MnO_2$; 5% $Ce_2O_3$; 5% $SiO_2$ and fillers | 28 $m^2/g$ |
| D | 92% $MnO_2$; 3.5% $La_2O_3$; 4.5% $SiO_2$ and fillers | 20 $m^2/g$ |
| E | 88% $MnO_2$; 8% $La_2O_3$; 4% fillers | 43 $m^2/g$ |

EXAMPLE 1

Analysis of Lanthanide Containing Purification Substrates C and D

Purpose

The purpose of the following tests was to evaluate the performance of materials C and D by measuring their respective contaminant removal capacities for moisture, oxygen, and carbon monoxide. The compositions of the media are listed above. Carbon monoxide release at elevated temperatures was also measured for both medias. The test results for the two materials were compared.

Experimental Method

A first group of three Aeronex 70K purifier canisters were filled with C media and a second group of three 70K canisters were filled with D media. The media was activated under a 1 slm 95% Ar/5% $H_2$ purge at 375° C. for 40 hours.

Oxygen Capacity

One of the 70K-C media purifiers and one of the 70K-D media purifiers were tested side by side. The oxygen capacity test parameters included: a 6.5 ppm oxygen challenge, 30 psig test gas pressure, and 3 slm gas flow through each test purifier. Each purifier was checked for breakthrough every weekday throughout the test. Oxygen concentration in the test purifiers' effluent was measured by a Delta F Nanotrace Oxygen Analyzer, which has an LDL of 0.2 ppb oxygen. Oxygen breakthrough levels were measured to above 100 ppb.

Moisture Capacity

One of the 70K-C media purifiers and one of the 70K-D media purifiers were tested side by side. The moisture capacity test parameters included: a 9.0 ppm moisture challenge, 30 psig test gas pressure, and 1.5 slm gas flow through each test purifier. Each purifier was checked for breakthrough every weekday through out the test. Moisture concentration in the test purifiers' effluent was measured by a Meeco Tracer Moisture Analyzer, which has an LDL of 1 ppb moisture. Moisture breakthrough levels were measured to above 100 ppb.

Carbon Monoxide Release/Capacity

The Hewlett-Packard GC equipped with a methanizer and FID was calibrated to measure ppb levels of carbon monoxide. A standard addition method using a cylinder with 351 ppm CO in nitrogen was used. Each test purifier was checked for CO release at room temperature, 200° C., 375° C., and 500° C. A heating mantle and a Temp-O-Trol ($I^2R$) temperature controller were used to heat the test purifiers. Following the initial release test, each purifier was subjected to an overnight vacuum at 500° C. to rid the media of adsorbed CO. After the vacuum step, each purifier was tested again for CO release at room temperature, 200° C., 375° C., and 500° C. Flow rate during release test was 3 slm nitrogen at 45 psig gas pressure. Carbon monoxide capacity tests were performed following the CO release test. CO capacity test parameters included: 3 slm nitrogen flow at 45 psig and an 800 ppb CO challenge.

Results/Discussion

Table 2 shows the results of the $O_2$, $H_2O$, and CO capacity test to the 1 ppb breakthrough point. Data are presented with units of liters contaminant per liter of media (L/L).

TABLE 2

| | Capacity test summary | |
|---|---|---|
| | Oxygen Capacity | Moisture Capacity |
| C | 6.0 L/L | 7.1 L/L |
| D | 5.1 L/L | 9.4 L/L |

The C media had a slightly higher capacity for oxygen whereas the D media had a higher capacity for moisture.

Oxygen Capacity

Oxygen breakthrough curves for the C and D materials are shown in FIG. 1.

Moisture Capacity

Figure 2:
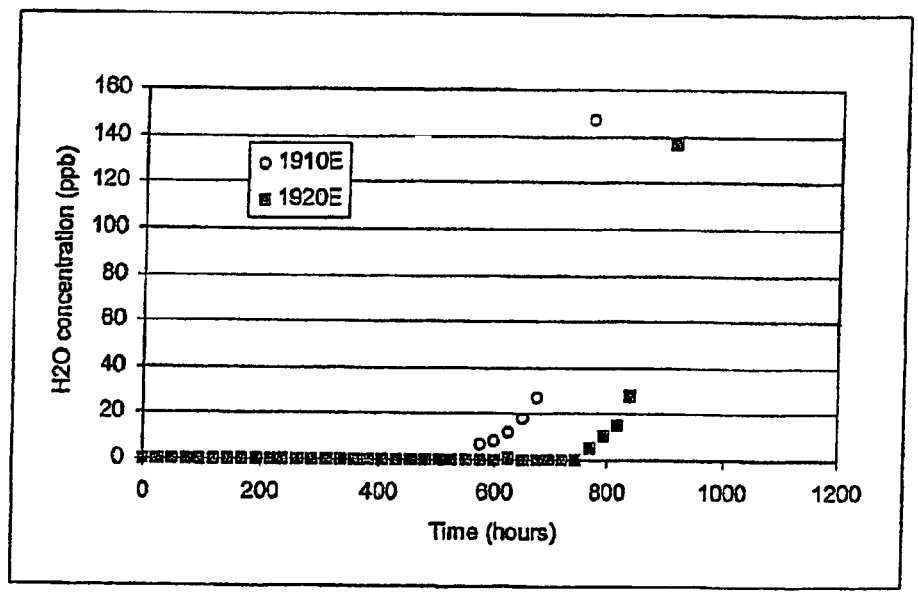
FIG. 2 is a moisture breakthrough curve for the C and D purification substrates.

Moisture breakthrough curves are shown in FIG. 2.

Carbon Monoxide Release/Capacity

Figure 3:
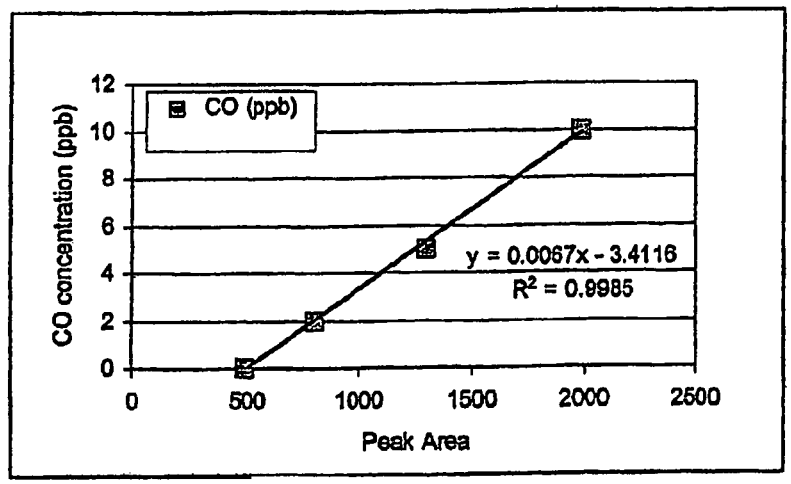
FIG. 3 is a carbon monoxide calibration curve to 10 ppb CO.

Carbon monoxide calibration curve to 10 ppb CO is shown in FIG. 3.

A lower detection limit (LDL) of 2 ppb CO was determined based on the calibration data. GC runs of 0 and 1 ppb yielded the same result. It was not until 2 ppb CO was injected into the GC when a definite increase in peak area was noted.

Figure 4:
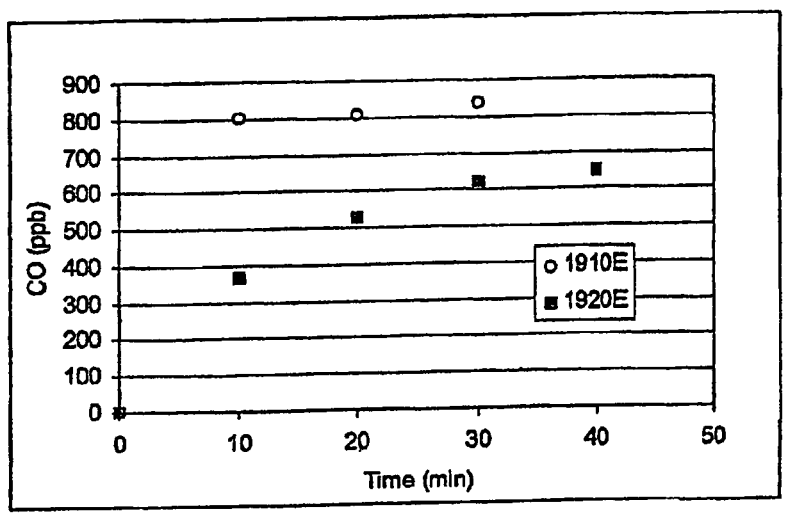
FIG. 4 is a breakthrough curve for the C and D purification substrates.

As seen in the CO breakthrough curves of FIG. 4, there was no low ppb level CO capacity for either material.

A summary of the CO release study is shown in Table 3.

TABLE 3

| | CO Release study | | | |
|---|---|---|---|---|
| | | | Room Temp | |
| | | 200° C. | 350° C. | 500° C. |
| C | 0 | 0 | 0 | 7 ppb |
| C post vacuum step | 4 ppb | 9 ppb | 13 ppb | 8 ppb |
| D | 0 | 0 | 3 ppb | 85 ppb |
| D post vacuum step | 0 | 0 | 0 | 0 |

Carbon monoxide was not detected until the purifier body was heated. The exception to this was the C media post vacuum step test. There could have been a higher level of CO in the background or the instrument could have been more sensitive that day. The vacuum step seemed to rid the D material of adsorbed CO. CO was not detected even at 500° C. after the vacuum step was performed on the D media. Methane peaks appeared in all of the above tests when the test purifier was heated to 200° C. or above. Carbon dioxide was also out-gassed at the higher temperatures.

Conclusion

The C media had an oxygen capacity that was slightly higher than the D media, but the D media had a moisture capacity that was greater than the C media. Neither material had any significant capacity to remove carbon monoxide, but it was the D media that was able to completely desorb CO after the 500° C. vacuum step. The C media still retained some CO after the vacuum step. Based on this study, the D media out-performed the C media overall.

EXAMPLE 2

Carbon Monoxide Release From Hydride Gas Purifiers

Purpose

The purpose of the following test was to compare the performance of the current hydride gas purifier technology as taught by Alvarez U.S. Pat. No. 6,241,955, (A media) and the new hydride gas purifier material of the instant invention (E media) with respect to carbon monoxide release at room temperature and at elevated temperatures. The carbon monoxide capacity of each media was also measured.

Experimental Method

A first Aeronex 70K purifier was filled with A media and a second 70K purifier was filled with E media. The compositions of the media are shown above.

The purifiers were activated with a 1 slm 95% Ar/5% $H_2$ purge at 375° C. for 40 hours. The Hewlett-Packard GC equipped with a methanizer and FID was calibrated to measure ppb levels of carbon monoxide. A standard addition method using a cylinder with 351 ppm CO in nitrogen was used. Each test purifier was checked for CO release at room temperature, 200° C., 375° C., and 500° C. A heating mantle and a Temp-O-Trol ($I^2R$) temperature controller were used to heat the test purifiers. If the purifier released CO at any of the temperatures, it was subjected to an overnight vacuum at 500° C. to rid the media of adsorbed CO. After the vacuum step, the purifier was tested again for CO release at room temperature, 200° C., 375° C., and 500° C. Flow rate during release test was 3 slm nitrogen at 45 psig gas pressure.

A carbon monoxide capacity test was performed following the CO release test. CO capacity test parameters for the A media included: 3 slm nitrogen flow at 45 psig and an 800 ppb CO challenge. CO capacity test parameters for the E media included: 3 slm nitrogen flow at 45 psig and a 10 ppb CO challenge.

Results/Discussion

A carbon monoxide calibration curve to 10 ppb CO is shown in FIG. 3. A lower detection limit (LDL) of 2 ppb CO was determined based on the calibration data. GC runs of 0 and 1 ppb yielded the same result. It was not until 2 ppb CO was injected into the GC when a definite increase in peak area was noted.

Figure 5:
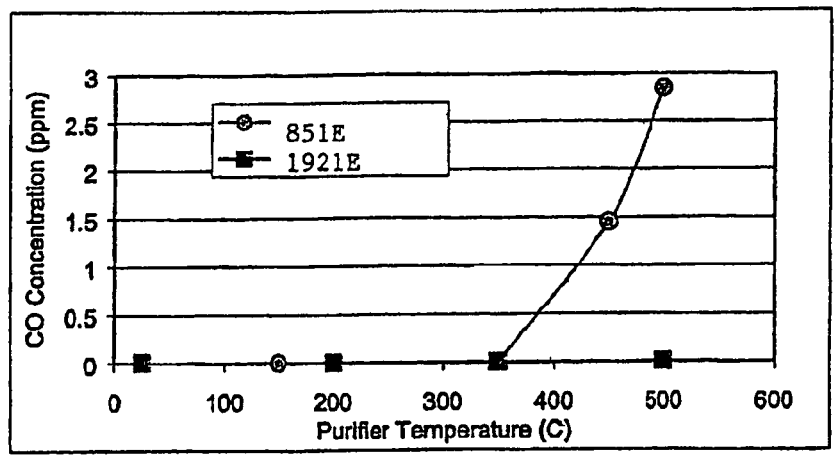
FIG. 5 is a CO release versus purifier temperature curve.

A summary of the CO release study is shown in FIG. 5 and Table 4.

TABLE 4

CO release study

|   | Room Temp | 200° C. | 350° C. | 500° C. |
|---|---|---|---|---|
| A | 0 | 0 | 1450 ppb | 2850 ppb |
| E | 0 | 0 | 0 | 0 |

Carbon monoxide was not detected until the A media was heated. The vacuum step seemed to rid the A material of adsorbed CO. CO was not detected at any of the tested temperatures after the vacuum step was performed on the A media. Methane peaks appeared in all of the A media tests when the test purifier was heated to 200° C. or above. Carbon dioxide also out-gassed at the higher temperatures with the A media.

Conclusion

The high temperature vacuum step was needed to rid the A media of adsorbed CO. The A media initially out-gassed CO. The A media did not have any capacity to remove carbon monoxide to ppb levels. The E media did not release any CO so no high temperature vacuum step was needed. Based on this study, the E media out-performed the A media.

EXAMPLE 3

Comparison of Water and Oxygen Removal Capacity of Non-lanthanide and Lanthanide Medias Purpose The purpose of the following tests was to evaluate the performance of A, B and E media by measuring their respective contaminant removal capacities for moisture and oxygen. The E media is a lanthanide based media. The C media is a manganese oxide based media. The A media is the manganese iron material currently used for hydride gas purification. Compositions of all the media are given above.

Experimental Method

Pairs of Aeronex 70K canisters were filled with each of the A, B or E media, six canisters total. The filled canisters were activated under 1 slm 95% Ar/5% $H_2$ purge at 375° C. for 40 hours.

Oxygen Capacity

The oxygen capacity test parameters included: a 6.5 ppm oxygen challenge, 30 psig test gas pressure, and 3 slm gas flow through each test purifier. Each purifier was checked for breakthrough every weekday throughout the test. Oxygen concentration in the test purifiers' effluent was measured by a Delta F Nanotrace Oxygen Analyzer, which has an LDL of 0.2 ppb oxygen. Oxygen breakthrough levels were measured to above 100 ppb.

Moisture Capacity

The moisture capacity test parameters included: a 9.0 ppm moisture challenge, 30 psig test gas pressure, and 1.5 slm gas flow through each test purifier. Each purifier was checked for breakthrough every weekday through out the test. Moisture concentration in the test purifiers' effluent was measured by a Meeco Tracer Moisture Analyzer, which has an LDL of 1 ppb moisture. Moisture breakthrough levels were measured to above 100 ppb.

Results/Discussion

Table 5 shows the results of the $O_2$ and $H_2O$ capacity test to the 1 ppb breakthrough point. Data are presented with units of liters contaminant per liter of media (L/L).

TABLE 5

Capacity test study

|   | Oxygen capacity | Moisture capacity |
|---|---|---|
| E | 9.36 L/L | 11.50 L/L |
| B | 3.85 L/L | NA |
| A | 3.4 L/L | 9.6 L/L |

The oxygen capacity of the E media is greater than that of the A and B media. The B media was not tested for moisture because the test purifier for this test was not properly activated.

EXAMPLE 4

Moisture Removal from Arsine Gas

A manifold was assembled to enable analysis of ULSI-grade arsine (Matheson 99.9995%) gas either bypassing or flowing through a Gatekeeper SK purifier (Mykrolis Corporation, Billerica, Mass.). The inlet and outlet moisture concentrations in arsine to the purifier were monitored using a Panametrics Series 3 moisture analyzer with M Series probes (NIST traceable calibration), which has a detection limit of −110±2° C. dew point (0.0015±0.001 ppm at 0 psig). Two separate moisture probes were located on either side of the test purifier to permit this analysis. In addition, the bypass and effluent gas were monitored using a Fourier Transform Infrared (FTIR) spectrometer equipped with a 10 meter gas cell.

After installation on the manifold and initial purging with inert gas, the purifier was conditioned with $AsH_3$ at a flow rate of 40 sccm. No significant temperature increase was observed (1.4° C.) during the conditioning step, which is indicative of compatibility of the purifier with arsine. Conditioning was shown to be complete after 150 bed volumes of arsine had passed through the purifier.

Figure 6:
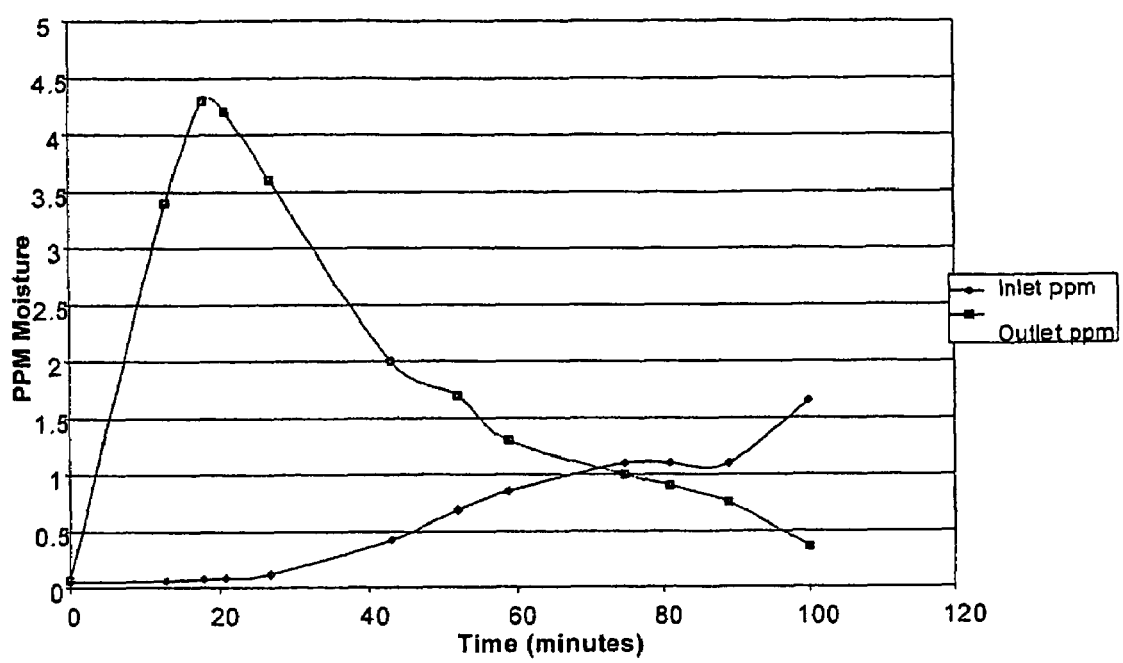
FIG. 6 shows moisture removal from arsine gas, as described in Example 4.

Moisture removal in arsine was demonstrated as shown in FIG. 6. The initial moisture content of the arsine exiting the purifier was higher than that entering the device. After 21 minutes of flow at 40 sccm, the moisture level at the outlet began decreasing. This initial moisture spike is believed to arise from arsine-induced desorption of moisture from downstream components exposed to the atmosphere during installation of items such as the integrated filter element. After approximately 1.5 hours, the outlet sensor indicated a lower moisture level than the inlet sensor. The dry-down response of the Panametrics moisture hygrometer is slow, taking 4 hours for the sensor to dry from 3 ppm to 0.03 ppm under 2 slm flow of dry nitrogen.

Figure 7:
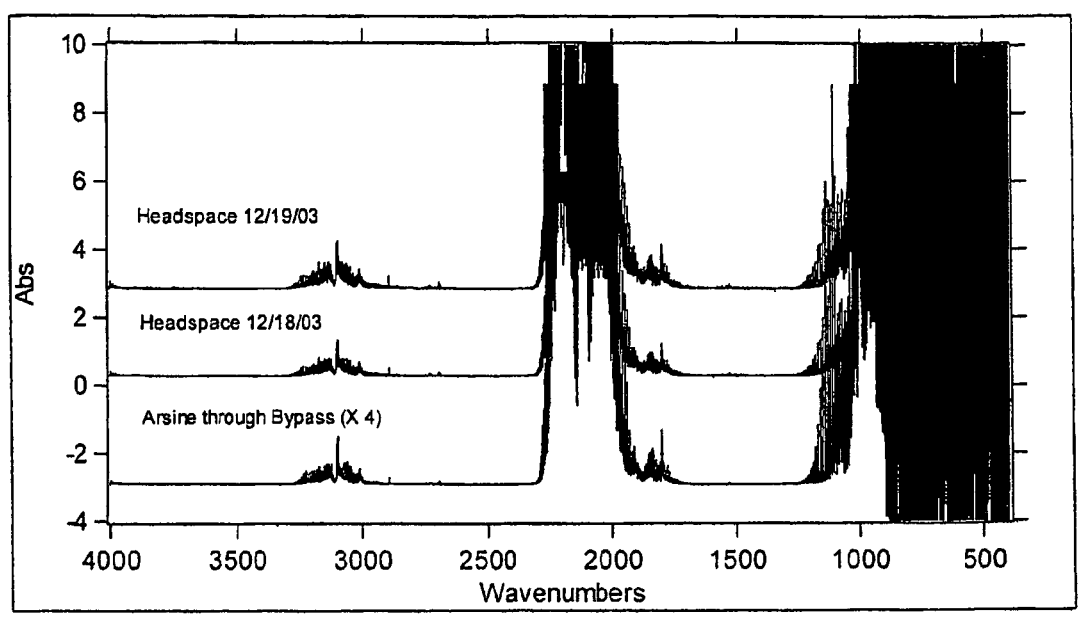
FIG. 7 shows the FT-IR spectrum of arsine gas before and after an overnight pressurization.

After exposure of the media to 22 L of arsine, the device was isolated and the pressure raised to 40.1 psia. The temperature and pressure were recorded overnight. After 13 hours, the pressure had risen to about 58 psia, an increase of 18 psi. The FT-IR of the headspace showed no observable by-products (FIG. 7), only arsine. It is inferred that the pressure increase arises from slow decomposition of arsine to form hydrogen.

Figure 8:
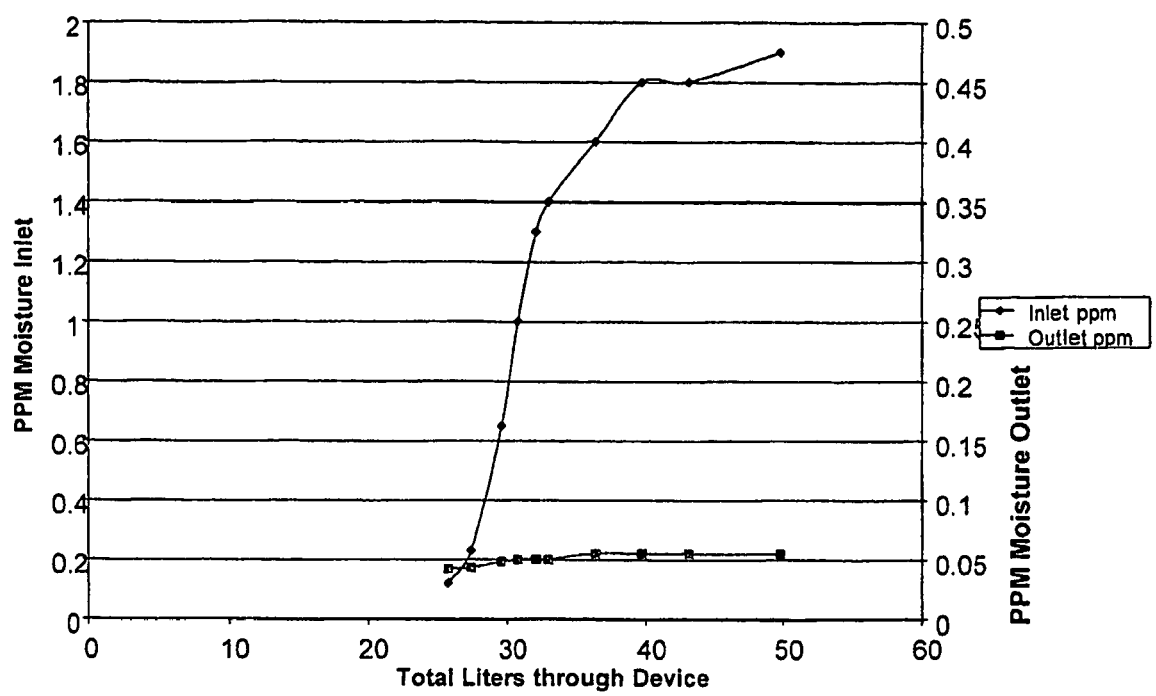
FIG. 8 shows the moisture content of arsine gas before and after contacting a conditioned medium.

After analyzing the headspace, the manifold was purged so that no arsine was detectable by the FT-IR. The device was then exposed to arsine again. After eighteen minutes of exposure to arsine (7 minutes at 336 sccm and 11 minutes at 168 sccm), the inlet Panametrics sensor showed a concentration of 0.12 ppm, while the outlet was 0.042 ppm. Over the next 50 minutes, the sensors stabilized at an inlet moisture level of 2 ppm and an outlet concentration of 0.055 ppm, as shown in FIG. 8.

EXAMPLE 5

Carbon Dioxide Removal Capacity of Lanthanide Media

Purpose

The purpose of the following tests was to evaluate the performance of E media by measuring the removal capacity for carbon dioxide. The E media is a lanthanide based media, whose composition is given above.

Experimental Method

An Aeronex 70K canister was filled with E media. The filled canister was activated under 1 slm 95% Ar/5% $H_2$ purge at 375° C. for 40 hours.

The Hewlett-Packard GC equipped with a methanizer and FID was calibrated to measure ppb levels of carbon dioxide. A standard addition method using a $CO_2$ gas cylinder was used. The $CO_2$ cylinder was diluted to make a 200 ppb $CO_2$ challenge in a nitrogen stream. Flow rate through the test purifier was 3 slm nitrogen at 45 psig gas pressure.

Results/Discussion

Figure 9:
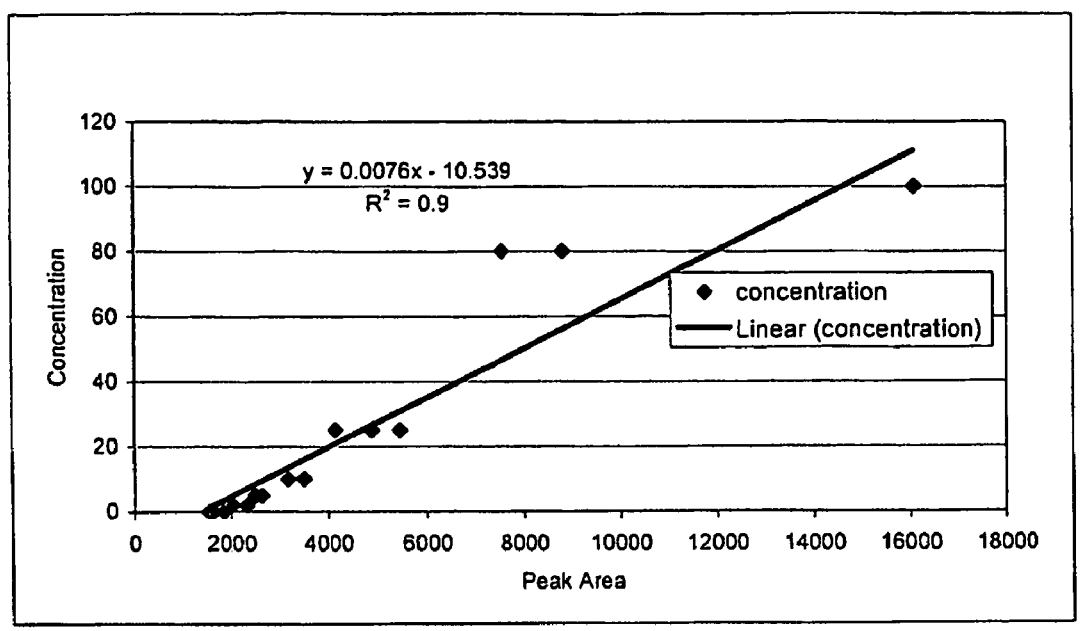
FIG. 9 is a carbon dioxide calibration curve to 100 ppb $CO_2$.

Carbon dioxide calibration curve to 100 ppb $CO_2$ is shown in FIG. 9.

A lower detection limit (LDL) of 2 ppb $CO_2$ was determined based on the calibration data. GC runs of 0 and 1 ppb yielded the same result. It was not until 2 ppb $CO_2$ were injected into the GC when a definite increase in peak area was noted.

The test purifier was checked for breakthrough every weekday throughout the test. The breakthrough point (above 2 ppb $CO_2$) occurred after 116 days. Capacity in liters contaminant per liters of media is calculated as follows:

(3 slm*116 days*24 hours*60 min*(200/1000000000))/0.066L=1.51 L/L

Conclusion

The E media has a CO2 capacity of 1.51 L/L to 2 ppb breakthrough.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for removal of contaminants from a stream of hydride gas, comprising contacting the hydride gas stream with a material comprising: a) 3-20% by weight of at least one metal oxide from the lanthanide series and b) at least one transition metal, or oxide thereof, to reduce the level of contaminants of the gas stream to not more than about 100 parts per billion (ppb), the material being substantially unaffected by the gas, wherein the transition metal is selected from the group consisting of molybdenum (Mo), manganese (Mn), chromium (Cr), rhenium (Re), platinum (Pt), rhodium (Rh), ruthenium (Ru), vanadium (V), titanium (Ti), and cobalt (Co).

2. The method of claim 1, wherein the metal oxide from the lanthanide series is an oxide of a metal selected from the group consisting of lanthanide (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm) and ytterbium (Yb).

3. The method of claim 1, wherein the metal oxide from the lanthanide series is an oxide of a metal selected from the group consisting of La, Ce and Sm.

4. The method of claim 1, wherein the material further comprises a highly electropositive metal or highly electropositive metal oxide.

5. The method of claim 1, wherein the material further comprises a rare earth metal selected from the group consisting of scandium (Sc), yttrium (Y) and lutetium (Lu), a lanthanide metal or oxide thereof, or a combination thereof.

6. The method of claim 1, wherein the transition metal is selected from the group consisting of manganese, chromium, molybdenum, vanadium, and titanium.

7. The method of claim 1, wherein the material is supported on a support substrate.

8. The method of claim 1, wherein the material has a surface area of less than about 100 $m^2/g$.

9. The method of claim 1, wherein the material has a surface area of less than about 75 $m^2/g$.

10. The method of claim 1, wherein the material has a surface area of less than about 50 $m^2/g$.

11. The method of claim 1, wherein the material has a surface area of less than about 20 $m^2/g$.

12. The method of claim 1, wherein the material has a capacity for oxygen that is at least about 4 liters of oxygen per liter of material at 25° C. and 15 psig.

13. The method of claim 12, wherein the material further has a capacity for water vapor that is at least about 4 liters of water vapor per liter of material at 25° C. and 15 psig.

14. The method of claim 1, wherein the hydride gas is selected from the group consisting of ammonia, arsine, phosphine, diborane, disilane, germane, silane and hydrogen.

15. The method of claim 1, wherein one or more of the contaminants are selected from the group consisting of water, carbon dioxide, oxygen, non-methane hydrocarbons, hydride gas oxidation products, secondary hydride gas contaminants, $SO_x$ and $NO_x$, wherein x is 1-3.

16. The method of claim 15, wherein one or more of the contaminants are selected from the group consisting of water, oxygen and a combination thereof.

17. The method of claim 1, wherein one or more of the contaminants are volatile metal compounds.

18. The method of claim 1, wherein one or more of the contaminants are metal-containing compounds.

19. The method of claim 1, wherein the metal of the lanthanide series is lanthanum oxide or cerium oxide.

20. The method of claim 1, wherein the transition metal oxide is manganese oxide.

21. A composition for the purification of hydride gases, comprising: a) 3-20% by weight of at least one metal oxide from the lanthanide series; and b) at least one transition metal, or oxide thereof, wherein the composition is essentially free of at least one of copper, iron and nickel; and the transition metal is selected from the group consisting of molybdenum (Mo), manganese (Mn), chromium (Cr), rhenium (Re), platinum (Pt), rhodium (Rh), ruthenium (Ru), vanadium (V), titanium (Ti), and cobalt (Co).

22. The composition of claim 21, wherein the transition metal or oxide thereof is manganese oxide.

23. A method of removal of one or more contaminants from a stream of hydride gas, comprising contacting the hydride gas stream with a material comprising: a) 3-20% by weight of at least one metal oxide from the lanthanide series selected from the group consisting of praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm) and ytterbium (Yb); and b) zirconium (Zr), or oxide thereof, to reduce the level of contaminants of the gas stream to not more than about 100 parts per billion (ppb), the material being substantially unaffected by the gas.

24. A method of removal of one or more contaminants from a stream of hydride gas, comprising contacting the hydride gas stream with a material comprising: a) lanthanum oxide or cerium oxide; and b) zirconium (Zr), or oxide thereof, to reduce the level of contaminants of the gas stream to not more than about 100 parts per billion (ppb), the material being substantially unaffected by the gas, wherein the hydride gas is selected from the group consisting of ammonia, arsine, phosphine, diborane, disilane, germane and hydrogen.

* * * * *